Figure 1:
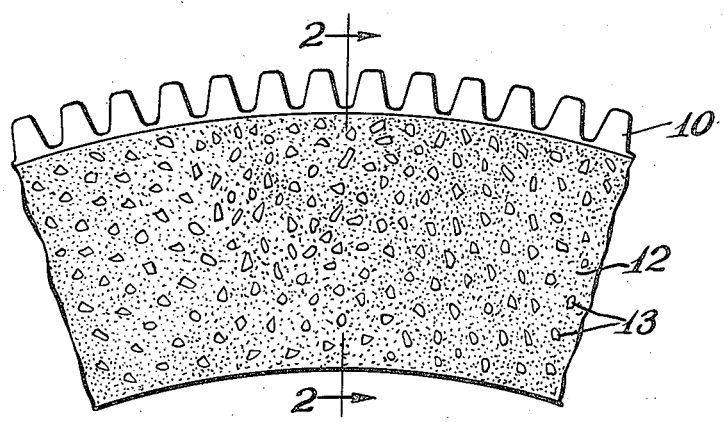

Jan. 7, 1958  C. S. BATCHELOR ET AL  2,818,634
SINTERED COPPER FRICTION ELEMENTS CONTAINING A MINERAL FILLER
Filed March 17, 1954

Inventors:
Clyde S. Batchelor
Rudolph E. Steck
By Gary, Desmond & Parker
Attys.

2,818,634
SINTERED COPPER FRICTION ELEMENTS CONTAINING A MINERAL FILLER

Clyde S. Batchelor, Trumbull, and Rudolph E. Steck, Stratford, Conn., assignors to Raybestos-Manhattan, Inc., Passaic, N. J., a corporation of New Jersey Application March 17, 1954, Serial No. 416,932

3 Claims. (Cl. 29—182.5)

This invention relates to the production of novel and improved friction materials such as clutch facings and brake linings.

More particularly, the present invention relates to sintered metal friction materials produced from powdered metals, wherein the sintered metal is in the continuous phase and provides the matrix or binder for other filler materials.

In the normal compounding of sintered metal products from powdered metals designed to function as friction material, a large proportion of the volume of the product is composed of powdered, inorganic, nonmetallic materials such as graphite, silica, kieselguhr, and the like, of a particle size all passing a 100 mesh sieve. The purpose of these nonmetallic constituents is varied. One purpose may be to condition the surface of a mating member so that its chemical and physical properties are uniform so that a uniform coefficient of friction can be maintained in the brake or clutch. Another purpose may be to impart a high or a median coefficient of friction. Another purpose may be to impart durability or wear resistance to the material. Another purpose may be to provide high temperature lubrication so that seizing or galling of friction material to a mating member is prevented. In any case, the final composition for a particular purpose is a balance between the metallic constituents which form a matrix and serve as binders, and the nonmetallic filler constituents which serve as friction modifiers. In many cases, this balance can be attained while still retaining sufficient binder on a volume-percentage basis, to yield a material that has integral structural strength for resisting the shearing stresses to which friction material is subject.

There are many cases, however, where this balance of structural strength and frictional properties cannot be achieved. The reason for this is that structural strength falls below the minimum necessary to resist failure in shear when the ratio of binder to filler approaches one to one by volume.

When the friction and wear characteristics desired are such as to require a greater filler percentage, the problem was not capable of solution prior to the present invention. A compromise wherein coefficient of friction or durability, or both, were sacrificed to gain strength, was always necessary. We have now found that when a limit of structural strength has been reached upon addition of fillers to a basic sintered metal composition, and it is further desired to increase the percentage of a desirable filler that if the particle size of this filler is increased, a new tolerance limit is achieved. We have further found that if it is desired to keep the mesh size of a desirable filler constant and yet an increasing percentage is desired that the mesh size of an adjacent filler in the compound can be increased to permit the additional loading with the desirable filler. The net effect of this discovery is that now it becomes easily possible to produce sintered metal friction compositions having the desirable characteristics of friction and resistance to wear without sacrifice of structural strength.

The novel compositions herein disclosed have several advantages other than or in addition to those cited above. Thus, when coarse grained mineral substances such as wollastonite, spodumene, mica, kyanite, graphite, mullite, feldspar, limestone or the like are used as fillers, a marked lowering of the specific gravity of the over-all composition can be gained. This means that cost per unit volume is decreased. A further advantage is that the large particles can be selected to serve as either islands of resistance to wear or as islands to modify the surface characteristics of the mating member by virtue of the relative Mohs scale hardness of the particle and the mating member. This modification of surface characteristics is important to eliminate the drop-off of friction known as "fade." It is furthermore advantageous to provide a uniform coefficient of friction by selection of a filler that will progressively break down to a dust and thereby exercise a controlling effect on brake or clutch output.

A further advantage lies in the marked effect of large particles in the prevention of the phenomena known as heat checking of friction material and mating members. This phenomena is usually seen in applications where friction material is subjected to severe duty. Under these conditions, heat is generated at the slipping interface at a greater rate than it can be carried away by radiation or transmission to adjacent metal or to air. The net effect of this action is a high skin temperature which usually results in the cracking of friction material or mating members. These cracks often penetrate deeply and sometimes cause actual rupture of a pressure plate. In the case of friction material, heat checks usually contribute to the failure of the material in shear.

We have found that, by selection of a coarse mineral particle having a Mohs scale hardness of 6 or above, the heat checking of mating members can be prevented. Although the exact reason is not known, it is presumed that heat checking of mating members is prevented because minute checks are machined out by the coarse particles as they occur.

The heat checking of friction material is controlled by the physical presence of the coarse particle which probably serves as a barrier to crack formation. In formulations where the quantity of relatively coarse particles was diminished to the point where they would not prevent minor crack formation, it has been observed that cracks occur only in the matrix material between coarse mineral particles and not through them. It was also observed that when the quantity of coarse particles was increased, cracking ceased entirely.

While it is not the purpose of this application to define all of the conditions and variables that permit control of heat checking, it is intended to show that coarse nonmetalic particles are an important means of control where sintered metal is the matrix material.

In the compounding of materials within the scope of this invention, we have found that the optimum particle size of the coarse grains lies within the range of from about 20 to about 60 mesh. We may, however, choose to use a minor proportion of the total particles to be larger than 20 mesh or even finer than 60 mesh in order to effect economies in the grading of the particles.

The examples following show the basic teaching of this disclosure. Formula "A" shows a highly-loaded typical sintered metal composition.

*Formula "A"*

| | Percent by Weight | Percent by Volume |
|---|---|---|
| Copper | 63 | |
| Tin | 7 | 56.5 |
| Iron | 5 | |
| Lead | 8 | |
| Graphite (200 mesh) | 7 | 43.5 |
| Silica (200 mesh) | 10 | |
| Specific gravity | 6.05 | |
| Coefficient of friction | 0.16 | |
| Wear per 100 slips | .005″ | |

Taking Formula "A" and loading it further by addition of fine Wollastonite (200 mesh) in the ratio of 80 parts Formula "A" and 20 parts of 200 mesh Wollastonite, the formula and results obtained were:

*Formula "B"*

|  | Percent by Weight | Percent by Volume |
|---|---|---|
| Copper | 50.4 | 36.4 |
| Tin | 5.6 | |
| Iron | 4.0 | |
| Lead | 6.4 | |
| Graphite (200 mesh) | 5.6 | 63.6 |
| Silica (200 mesh) | 8.0 | |
| Wollastonite (200 mesh) | 20.0 | |
| Specific gravity | 4.85 | |
| Coefficient of friction | Failed in Shear | |
| Wear per 100 slips | No measurement possib | |

Using the teachings of the present invention and keeping Formula "B" exact except for substitution of 20 mesh Wollastonite for the 200 mesh Wollastonite previously used as per the following formula, the coefficient of friction was found to be .21 with a wear value per 100 slips of .005". The sintered metal was unaffected physically by the test.

*Formula "C"*

|  | Percent by Weight | Percent by Volume |
|---|---|---|
| Copper | 50.4 | 36.4 |
| Tin | 5.6 | |
| Iron | 4.0 | |
| Lead | 6.4 | |
| Graphite (200 mesh) | 5.6 | 63.6 |
| Silica (200 mesh) | 8.0 | |
| Wollastonite (20 mesh) | 20.0 | |

The coefficient of friction in the above was determined by making two 10-second slips per minute at a pressure of 50 pounds per square inch at 600 revolutions per minute on one rubbing surface of 15½" outside diameter by 12⅞" inside diameter clutch facing.

Thus, although the incorporation of relatively large size inorganic, nonmetallic particles permits the employment of greater than 50% by total volume of fillers without sacrifice in structural strength as hereinbefore pointed out, the employment of such large size particles imparts many other or added advantages as further pointed out, so that they may be advantageously included even when the volume of fillers is kept below 50%. These advantages become apparent with as low proportions as about 5% by volume, and up to about 35% of these relatively large size particles may be employed in the total mix.

In other words, the friction materials of the present invention are at all times composed of both powdered metals and powdered nonmetallic inorganic fillers of 100 mesh size or finer, the proportions being such that the powdered fillers are in minor amount, i. e., less than 50% by volume of the total of powdered filler plus powdered metal, and when sintered, the powdered metal forms the matrix or binder. To this basic composition we add, in accordance with the present invention, the 20–60 mesh size material as a third characterizing component, even though the third component may be the same or a different filler material from that employed in powdered form, and even though this added large particle size material may or may not increase the proportion of fillers to a volume greater than 50% of the whole, consistent with the objects and advantages previously pointed out.

The accompanying drawings illustrate a friction element formed in accordance with the present invention.

Figure 2:
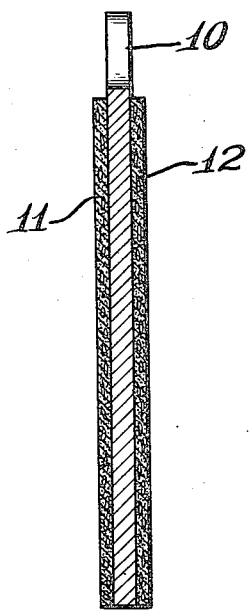

Fig. 1 is a fragmentary side elevation of clutch ring embodying a facing, in accordance with the present invention, and Fig. 2 is a section on the line 2—2 of Fig. 1.

Referring to the drawings, the reference numeral 10 illustrates a metallic clutch ring having bonded to the opposed faces thereof friction faces 11 and 12 formed in accordance with the present invention, characterized by having incorporated therewith and substantially uniformly distributed and dispersed through the body mass in a discontinuous phase, the discrete, coarse or relatively large size, visibly distinct, inorganic, nonmetallic filler particles 13.

Although we have indicated several powdered metals in the foregoing examples, it will be understood that our invention is not restricted thereto, nor to the specific relative proportions shown therein, since we may employ the powdered metals conventional to the art in various proportions and combinations, such that they comprise a major amount, i. e., more than 50% by volume of the total of powdered metal plus powdered filler.

The friction elements of the present invention are formed by conventional procedures, as for example by first subjecting a mixture of the powdered metal, powdered filler and relatively large particle size filler to cold pressing in a mold into briquettes or wafers at pressures of upwards of 5,000 and suitably at 20,000 to 30,000 pounds per square inch, followed by heat treating to sinter the metal, such as at temperatures of from about 1200° F. to about 2000° F., depending on the nature and amounts of the respective metals employed, and under relatively low pressures such as 50 to 500 pounds per square inch, as is well known to the art. Likewise, when an easily oxidizable metal powder such as copper is employed, a protective or inert atmosphere is desirably maintained in the heating furnace.

In addition to the use of the composition of the present invention for clutch facings and brake linings, it will be understood that it may be employed for the production of brake blocks, buttons for brakes or clutches and other automotive or industrial frictional apparatus in the operation of which slippage occurs between opposing surfaces of mutually engaging parts thereof.

We claim:

1. A friction element composed essentially of a major portion by volume of nonmetallic inorganic friction material and a minor portion by volume of sintered powdered metal comprising principally copper, providing a continuous metal binder retaining said inorganic material, from about 5% to about 35% by volume of said friction element being composed of relatively large particles of from about 20 to about 60 mesh size substantially uniformly distributed therethrough and selected from the group consisting of wollastonite, spodumene, kyanite, mullite and feldspar, the balance of said inorganic friction material being powdered and of a size all passing a 100 mesh sieve and of a volume smaller than the volume of said powdered metal.

2. The friction element of claim 1 wherein said relatively large particles are mullite.

3. The friction element of claim 1 wherein said relatively large particles are wollastonite.

References Cited in the file of this patent

UNITED STATES PATENTS

| 2,239,134 | Wellman | Apr. 22, 1941 |
| 2,408,430 | Lowey et al. | Oct. 1, 1946 |
| 2,470,269 | Schaefer | May 17, 1949 |
| 2,654,945 | Richardson et al. | Oct. 13, 1953 |

FOREIGN PATENTS

| 740,820 | Great Britain | Nov. 23, 1955 |